Jan. 7, 1969  W. A. McALLISTER  3,420,781
RARE EARTH ACTIVATED STRONTIUM LITHIUM GERMANATE PHOSPHORS
Filed March 14, 1966

WITNESSES:

INVENTOR
William A. McAllister
BY
ATTORNEY

United States Patent Office 3,420,781
Patented Jan. 7, 1969

3,420,781
RARE EARTH ACTIVATED STRONTIUM
LITHIUM GERMANATE PHOSPHORS
William A. McAllister, Morristown, N.J., assignor to
Westinghouse Electric Corporation, Pittsburgh,
Pa., a corporation of Pennsylvania
Filed Mar. 14, 1966, Ser. No. 534,145
U.S. Cl. 252—301.4                 4 Claims
Int. Cl. C09k 1/04

This invention relates generally to phosphors and, more particularly, to rare earth activated strontium lithium germanate phosphors.

Phosphors which convert ultraviolet radiations into visible radiations have utility in fluorescent lamps and in other discharge devices. Phosphors which have a line emission have utility in such devices, particularly as a constituent in a phosphor blend, in order to achieve a desired color. It is desirable for phosphors to have an emission color which may be varied. Phosphors which respond to ultraviolet excitation to produce a line emission in the green region of the spectrum are particularly useful since the output of the phosphor is concentrated where the eye is most sensitive, in order to achieve a maximum of luminosity. Phosphors which are excited by cathode rays are also useful in such devices as color television.

It is therefore an object of this invention to provide a strontium lithium germanate phosphor composition which converts ultraviolet radiations into line emission visible light.

It is a further object of this invention to provide a strontium lithium germanate phosphor composition in which the emission color may be altered by altering the phosphor activator.

It is another object of this invention to provide a strontium lithium germanate phosphor composition which emits in the green wavelengths when excited.

It is yet another object of this invention to provide a strontium lithium germanate phosphor composition which emits in the red wavelengths when excited.

It is an additional object of this invention to provide a strontium lithium germanate phosphor which is luminescent when excited by cathode rays.

Briefly, these and other objects are achieved by providing a strontium lithium germanate phosphor composition having the general formulation $SrO \cdot Li_2O \cdot GeO_2$:(Tb or Eu). Good luminescence is observed when the gam-atom ratios of strontium, lithium, and terbium or europium taken with respect to the germanium in the composition fall within the following ranges:

$0.65 \leq Sr/Ge \leq 2.6$,
$0.1 \leq Li/Ge \leq 2$, and
$0.04 \leq (Tb\ or\ Eu)/Ge \leq 0.2$.

For a better understanding of the invention, reference should be made to the accompanying drawings in which.

As a specific example for making the present phosphor, a raw mix is prepared which contains 1.29 moles strontium oxide, 0.5 mole lithium carbonate, 1 mole germanium oxide, and 0.027 mole terbium oxide ($Tb_4O_7$). This raw mix is placed in a firing boat preferably made of platinum or palladium. The raw mix is fired at a temperature of about 950° C. (see FIG. 1) from about 1 hour to about 3 hours, 2 hours being preferred. Preferably, the firing is interrupted after about 1 hour to grind the phosphor raw mix before firing the remaining hour. This procedure enhances the reaction and improves the quality of the resulting phosphor. A firing atmosphere of nitrogen, or nitrogen with 2% by volume hydrogen is employed in this example where terbium is the activator. Referring to the spectrum shown in FIG. 2, the resulting phosphor is green emitting when excited by 254 nm. A similar spectrum is obtained for 365 nm. excitation.

It is to be understood that other compounds containing Sr, Li, Ge and Tb may be employed in the raw mix. For example, the carbonates of Sr and Ge (which form the desired oxides when heated) may be used. Terbium acetate or terbium nitrate may be used to supply the required terbium.

Figure 3:
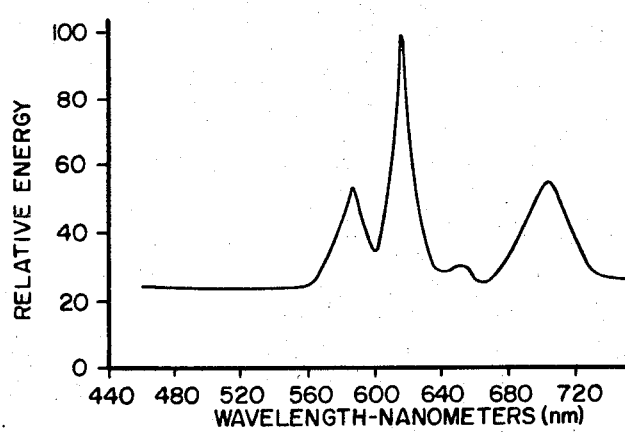
FIG. 3 is the emission spectrum of the europium activated phosphor excited by 254 nm. showing intense emission in the red region of the spectrum (about 620 nm.).

In the case of the europium activator, 0.054 mole of europium oxide ($Eu_2O_3$) is used in place of the terbium oxide in the above example with similar results. If europium is used, the firing is preferably done in oxygen or air, the other firing conditions remaining the same. Referring to the spectrum shown in FIG. 3, the resulting phosphor is red emitting under excitation by 254 nm. A similar spectrum is obtained for 365 nm. excitation.

Figure 1:
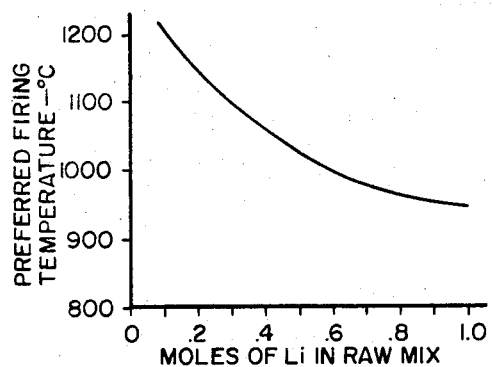
FIGURE 1 is a plot of the preferred firing temperature of the present phosphor versus the lithium concentration therein.
Figure 2:
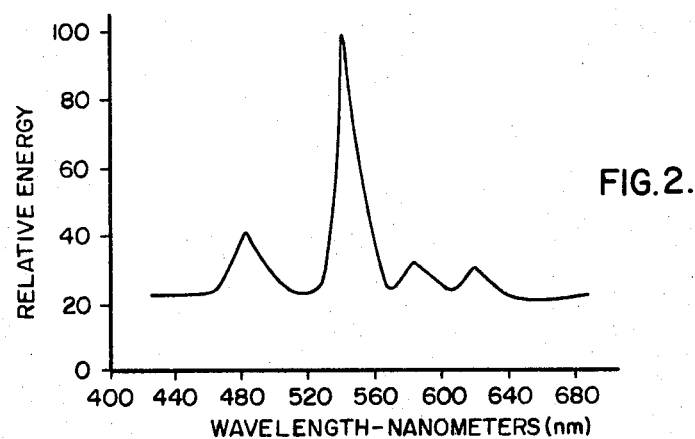
FIG. 2 is the emission spectrum of the terbium activated phosphor excited by 254 nm. showing intense emission in the green region of the spectrum (about 550 nm.)

The firing temperature may vary from about 900° C. to about 1250° C. The preferred firing temperature is determined by the lithium concentration employed. For a lithium concentration of 0.2, 0.6, and 1.0, the preferred firing temperatures are 1150° C., 1000° C., and 950° C., respectively. Firing temperatures much higher or lower than these values at each lithium concentration produce inferior luminescent products. FIG. 1 of the accompanying drawing is a plot of preferred firing temperature against the lithium concentration.

The phosphor has the general formulation

$$u SrO \cdot \frac{w}{2} Li_2O \cdot y GeO_2 : z(Tb\ or\ Eu)$$

wherein $u$ is the number of gram atoms of strontium in the phosphor, $w$ is the number of gram atoms of lithium, $y$ is the number of gram atoms of germanium, and $z$ is the number of gram atoms of terbium or europium.

The composition of the raw mix of this phosphor may vary considerably. Good luminescence is observed when the gram-atom ratios of strontium, lithium, terbium, or europium taken with respect to the germanium in the composition fall within the following ranges:

$0.65 \leq u/y \leq 2.6$,
$0.1 \leq w/y \leq 2$, and
$0.04 \leq z/y \leq 0.2$.

However, the following composition range is preferred:

$1 \leq u/y \leq 1.8$,
$0.5 \leq w/y \leq 1.5$, and
$0.08 \leq z/y \leq 0.12$.

The best output is obtained when the total positive charges of the elements strontium, lithium and the activator elements are approximately equal to the total positive charges of the element germanium. The elements strontium, lithium, terbium, europium, and germanium have the following charges respectively, +2, +1, +3, +3, and +4. The three-plus charge on terbium assumes that all of the terbium in terbium oxide ($Tb_4O_7$) is converted during firing to the three-plus oxidation state. The above-described charge balance exists when $$2u + 1w + 3z \cong 4y$$

For the preferred composition described hereinbefore, the following is true:

$u = 1.29$,
$w = 1$,
$z = .108$, and
$y = 1$.

Substituting these values in the above equation gives:

$2(1.29) + 1(1) + 3(.108) \cong 4(1)$,
$2.58 + 1 + .324 \cong 4$,
$3.904 \cong 4$.

The phosphors of the present invention are also responsive to cathode rays. Under electron excitation, the terbium activated phosphor emits in the yellow-green and europium activated phosphor emits in the red. Both emissions are of the line type.

It will be apparent to those skilled in the art that the objects of this invention have been achieved by providing a strontium lithium germanium phosphor which converts ultraviolet radiations into visible light. This phosphor has a line emission spectrum. The phosphor is also cathodoluminescent.

While preferred embodiments of this invention have been illustrated and described in detail, it is to be particularly understood that the invention is not limited thereto or thereby.

I claim as my invention:

1. A phosphor composition having the general formulation

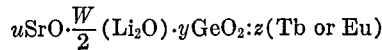

wherein $0.65 \leq u/y \leq 2.6$,
$0.1 \leq w/y \leq 2$, and
$0.04 \leq z/y \leq 0.2$.

2. The phosphor as specified in claim 1, wherein:

$1 \leq u/y \leq 1.8$,
$0.5 \leq w/y \leq 1.5$, and
$0.08 \leq z/y \leq 0.12$.

3. The phosphor as specified in claim 1, wherein:

$2u + 1w + 3z \cong 4y$.

4. The phosphor as specified in claim 3, wherein:

$u = 1.29$,
$w = 1$,
$z = .108$, and
$y = 1$.

References Cited

UNITED STATES PATENTS 2,457,054  12/1948  Leverenz _____ 252—301.4
2,297,108  9/1942   McKeag et al. _____ 252—301.4

FOREIGN PATENTS 1,094,313  12/1967  Great Britain.

TOBIAS E. LEVOW, *Primary Examiner.*

ROBERT D. EDMONDS, *Assistant Examiner.*